(12) United States Patent
Garduño Estebanez et al.

(10) Patent No.: US 12,473,704 B2
(45) Date of Patent: Nov. 18, 2025

(54) SYSTEM FOR MANUFACTURING A PRECAST FOUNDATION STRUCTURE FOR A WIND TURBINE, RELATED MANUFACTURING METHOD AND WIND TURBINE MANUFACTURED WITH SAID METHOD

(71) Applicant: NORDEX ENERGY SPAIN, S.A.U., Navarra (ES)

(72) Inventors: Aitor Garduño Estebanez, Navarra (ES); Iván García Maestre, Navarra (ES); Teresa Arlabán Gabeiras, Navarra (ES); Miguel Núñez Polo, Navarra (ES)

(73) Assignee: NORDEX ENERGY SPAIN, S.A.U., Navarra (ES)

( * ) Notice: Subject to any disclaimer, the term of this patent is extended or adjusted under 35 U.S.C. 154(b) by 267 days.

(21) Appl. No.: 18/268,089

(22) PCT Filed: Dec. 17, 2021

(86) PCT No.: PCT/EP2021/086548
§ 371 (c)(1),
(2) Date: Jun. 16, 2023

(87) PCT Pub. No.: WO2022/129555
PCT Pub. Date: Jun. 23, 2022

(65) Prior Publication Data
US 2024/0035247 A1    Feb. 1, 2024

(30) Foreign Application Priority Data

Dec. 17, 2020 (EP) .................................. 20383117

(51) Int. Cl.
*E02D 27/42*   (2006.01)
*F03D 13/20*   (2016.01)

(52) U.S. Cl.
CPC .......... *E02D 27/425* (2013.01); *F03D 13/20* (2016.05); *E02D 2250/0007* (2013.01)

(58) Field of Classification Search
CPC .......... E04D 27/425; E04D 2250/0007; Y02E 10/72; Y02E 10/728; F03D 13/22; F03D 13/20
See application file for complete search history.

(56) References Cited

U.S. PATENT DOCUMENTS

| | | | |
|---|---|---|---|
| 2008/0072511 A1* | 3/2008 | Phuly | ...................... E02D 27/28 52/294 |
| 2012/0167499 A1* | 7/2012 | Knisel | ...................... F03D 13/22 52/231 |

(Continued)

FOREIGN PATENT DOCUMENTS

| | | |
|---|---|---|
| DE | 10 2019 109 503 A1 | 10/2019 |
| WO | 2011030199 A2 | 3/2011 |

(Continued)

*Primary Examiner* — Andrew J Triggs
(74) *Attorney, Agent, or Firm* — Hayes Soloway P.C.

(57) ABSTRACT

The present invention relates to a system for manufacturing an adaptable precast foundation structure for a wind turbine that is configured taking into account the wind turbine loads and soil conditions allowing that a large part of the foundation structure is homogenized, despite the fact that the transition structure being manufactured with the system is dependent of the type of soil and that the size of said transition structure varies depending on the soil, making it easily adaptable to the geotechnical conditions of each wind turbine position of the windfarm which allows a significant reduction in time and cost. The invention also relates to a method for manufacturing an adaptable precast foundation structure for a wind turbine and to a wind turbine manufactured with said method. The invention also relates to a (Continued)

system for manufacturing a precast foundation structure for a wind turbine and related method and precast foundation structure.

18 Claims, 10 Drawing Sheets

(56) References Cited

U.S. PATENT DOCUMENTS

| | | | |
|---|---|---|---|
| 2020/0018035 A1* | 1/2020 | Schuldt | E04H 12/08 |
| 2024/0035247 A1* | 2/2024 | Garduño Estebanez | F03D 13/22 |

FOREIGN PATENT DOCUMENTS

| | | | |
|---|---|---|---|
| WO | 2017141095 A1 | 8/2017 | |
| WO | 2020012346 A1 | 1/2020 | |

* cited by examiner

SYSTEM FOR MANUFACTURING A PRECAST FOUNDATION STRUCTURE FOR A WIND TURBINE, RELATED MANUFACTURING METHOD AND WIND TURBINE MANUFACTURED WITH SAID METHOD

CROSS-REFERENCE TO RELATED APPLICATIONS AND PRIORITY

This patent application claims priority from PCT Application No. PCT/EP2021/086548 filed Dec. 17, 2021, which claims priority from European Patent Application No. 20383117.7 filed Dec. 17, 2020.

OBJECT OF THE INVENTION

The present invention relates to a system for manufacturing an adaptable precast foundation structure for a wind turbine that is configured taking into account the wind turbine loads and soil conditions.

The object of the present invention is a system for manufacturing an adaptable precast foundation structure for a wind turbine which allows that a large part of the foundation structure is homogenized, despite the fact that the transition structure being manufactured with the system is dependent of the type of soil and that the size of said transition structure varies depending on the soil, making it easily adaptable to the geotechnical conditions of each wind turbine position of the windfarm which allows a significant reduction in time and cost.

The invention also relates to a method for manufacturing an adaptable precast foundation structure for a wind turbine and to a wind turbine manufactured with said method.

The invention also relates to a system for manufacturing a precast foundation structure for a wind turbine, to a method for manufacturing a precast foundation structure for a wind turbine and to a precast foundation structure for a wind turbine.

BACKGROUND OF THE INVENTION

As wind turbines grow in height, rotor diameter and rated power, the foundation needed to support them also increases. The cost of the foundation is approximately 16% of the total cost of the wind farm, so any optimization in it has a great impact on the capital expenditure.

Large wind farms with a large number of wind turbines take up large areas of land so it is common that the mechanical properties of the ground in which they must be installed are different in different areas of a same wind farm. Each wind turbine has its own foundation design associated with it, which allows the loads to be transmitted from the tower to the ground but, when ground conditions change, the entire foundation must be redesigned.

It is known foundations for a tower structure having a central pedestal of the rib on a slab type comprising a prefabricated or cast-in-situ rib with a horizontal base having two sides and having a means along the length of the two sides of the horizontal base, or a means, under the base for connecting to and being structurally fixed to a cast-in-situ slab, wherein such means ensure structural continuity of the slab across or under the rib, and the rib has a proximal vertical end having a means thereon for connecting to and being structurally fixed to a cast-in-situ pedestal wherein such means ensure structural continuity of the pedestal to the rib, and post tensioning elements running through the ribs and the pedestal for connecting the ribs to the pedestal under post compression stress.

It is also known a foundation system for a tower, such as a wind turbine, that includes a central hub assembly, a plurality of post-tensioned concrete beams, and an anchoring system associated with each beam, wherein in use the foundation system is arranged so that the bottom surfaces of the concrete beams bear on ground and the anchoring is disposed within the ground.

However, in the above cited foundations the dimensions of the foundation structure do not take into account the soil conditions when the latter change. The system for manufacturing an adaptable precast foundation structure for a wind turbine of the present invention solves the aforementioned drawbacks.

DESCRIPTION OF THE INVENTION

The present invention relates to a system for manufacturing an adaptable precast foundation structure for a wind turbine which allows that a large part of the foundation structure is homogenized, despite the fact that the transition structure being manufactured with the system is dependent of the type of soil and that the size of said transition structure varies depending on the soil, making it easily adaptable to the geotechnical conditions of each wind turbine position of the windfarm which allows a significant reduction in time and cost.

The invention relates to a system for manufacturing an adaptable precast foundation structure for a wind turbine, wherein the adaptable precast foundation structure comprises:
  a footing intended to rest on a ground;
  at least a plinth comprising a surface wherein a tower of the wind turbine is intended to be coupled;
  a transition structure comprising a plurality of ribs that extend radially outward from the surface or from a vertical projection of the surface wherein a tower of the wind turbine is intended to be coupled;
  and wherein the system comprises:
    at least a first mould configured to cast at least a first rib of the transition structure, wherein the first mould comprises a main formwork and an auxiliary formwork, and wherein the auxiliary formwork is configured to adjust at least a representative dimension of the at least a first rib of the transition structure.

Preferably, the representative dimension of the at least a first rib of the transition structure is the length of the at least a first rib of the transition structure.

Thus configured, the system uses the at least one mould to make possible to modify the dimensions of the at least the first rib of the transition structure in such a way that the size of the foundation structure can be adapted according to wind turbine loads and soil conditions. Furthermore, the at least one mould is reusable.

In this way, with the system of the present invention it is possible to homogenize a large part of the foundation structure for different wind turbines, despite the fact that the transition structure is dependent of the type of soil and that the size of the transition structure will change depending on the soil. In particular, the foundation structure is easily adaptable to the geotechnical conditions of each wind turbine location of the windfarm which allows a significant reduction in time and cost.

The system for manufacturing an adaptable precast foundation structure for a wind turbine so configured has additional advantages to those explained above:
- special formwork on-site is no longer necessary since the complicated geometries are performed in factory.
- higher quality control,
- precast and standard pieces: deviations and non-conformities avoided during in-situ execution.

Preferably, the system further comprises at least a second mould configured to cast at least a second rib of the transition structure, wherein the second mould comprises a main formwork and an auxiliary formwork, and wherein the auxiliary formwork is configured to adjust at least a representative dimension of the at least a second rib of the transition structure.

In this way, the auxiliary formwork of the first mould and/or of the second mould comprises a plate that is displaceable along the representative dimension of at least a first rib and/or of the at least a second rib respectively, Thus, before the concreting means pours concrete into the first mould or the second mould, the representative dimension is adjusted.

Preferably, the representative dimension of the at least a second rib of the transition structure is the length of the at least a second rib of the transition structure.

Preferably, the auxiliary formwork of the first mould configured to adjust at least a representative dimension of the at least a first rib and the auxiliary formwork of the second mould configured to adjust at least a representative dimension of the at least a second rib are configured to adjust the same representative dimension for the at least a first rib and the at least a second rib, being preferably configured to adjust the same representative dimension to the same value for both the at least a first rib and the at least a second rib or being preferably configured to adjust the same representative dimension to a different value for the at least a first rib and the at least a second rib.

In this way, it is possible to adjust the at least a representative dimension of the at least a first rib in a dependent or independent manner of adjusting the at least a representative dimension of the at least a second rib depending of the type of soil and the necessary size of each rib of the transition structure.

Preferably, the at least a first mould and/or the at least a second mould are/is also configured to cast at least partially the plinth.

Preferably, the at least a representative dimension of the at least a first rib and/or of the at least a second rib, depends on a total diameter of the foundation, which in turn depends on the type of soil. Preferably, the at least a representative dimension of the at least a first rib and/or of the at least a second rib is the length of the at least a first rib and/or the length of the at least a second rib respectively, being half of the difference of the total diameter of the foundation minus an outer diameter of the plinth.

Optionally, the main formwork of the first mould and/or of the second mould further comprises a template configured to define at least a channel in a lower surface of the at least the first rib and/or of the second mould of the plurality of ribs of the transition structure. Thus configured, slippage between the transition structure and the footing is avoided when the adaptable precast foundation is manufactured.

Optionally, the main formwork of the first mould and/or of the second mould is an open formwork, thus defining at least one free surface wherein first reinforcement elements are intended to be attached. Preferably, the at least one free surface of the open formwork defines the lower surface of the at least the first rib and/or of the at least the second rib respectively, of the plurality of ribs of the transition structure. In this way, a structural connection between the transition structure and the footing is performed when the footing is casted in-situ, since the first reinforcement element of the at least the first rib and/or the at least the second rib of the plurality of ribs of the transition structure, being lower reinforcements elements, weaves together with the footing. This structural connection between the transition structure and the footing allows that the weight of the footing itself and the ground located on top of it contribute to guarantee the stability of the wind turbine.

Optionally, both options, the main formwork comprising a template and the main formwork being an open formwork can be combined.

Additionally, the main formwork of the first mould and/or the second mould comprises first lateral walls configured to define two lateral surfaces of the plinth wherein second reinforcement elements, being lateral reinforcements, are intended to be attached. The first lateral walls of the main formwork comprise side-opening gates which allow to attach the lateral reinforcements and open the gates once the concrete has completely set, so the first lateral walls are removed allowing the at least a first rib and/or the second rib to be removed with the lateral reinforcement elements already attached. In this way, a structural connection between all the elements forming the plinth is performed when the plinth is assembled. The structural connection between all elements forming the plinth allows that the plinth so formed works as a monolithic element.

Optionally, the system further comprises concreting means configured to pour concrete into the first mould and/or into the second mould.

Preferably, the system for manufacturing an adaptable precast foundation structure for a wind turbine further comprises transportation means configured to transport at least a first rib and/or at least a second rib of the plurality of ribs of the transition structure from the first mould and/or the second mould respectively, to the wind turbine location.

In case that the at least a first mould and/or the at least a second mould are/is also configured to cast at least partially the plinth, the transportation means are also configured to transport the at least a first rib together with at least partially the plinth and/or the at least a second rib together with at least partially the plinth.

Optionally, the system further comprises means for casting the footing.

Preferably, the means for casting the footing comprises an additional mould configured to precast at least partially the footing of the adaptable precast foundation structure. In this way, the footing is a precast concrete footing, preferably a slab.

Also preferably, the means for casting the footing are means for casting the footing in-situ. In this way, the footing is a cast-in-situ concrete footing, preferably a slab. This ensures a homogeneous soil-structure contact beneath the whole foundation structure.

Also preferably, the means for casting the footing are means for casting the footing partially in the factory and partially in-situ. Preferably, the footing comprises a framework and concrete, wherein the framework is casted in the factory and the concrete is poured in-situ.

For both of the additional mould or the means for casting the footing in-situ, the dimensions of the foundation structure, in particular the at least a representative dimension of the at least a first rib and/or at least a second rib of the transition structure, and optionally an inner and an outer diameter of the footing being a slab, depends on the wind turbine loads and also on the strength and the elastic properties of the soil.

Optionally, the system further comprises assembly means configured to carry out the assembly of at least the plurality of ribs of the transition structure and optionally at least partially the plinth in the case that the at least a first mould and/or the at least a second mould are/is also configured to cast at least partially the plinth together with the at least a first rib and/or the at least a second rib respectively.

Preferably, the assembly means are configured to carry out the assembly of the at least a second rib of the plurality of ribs and optionally of at least partially the plinth adjacent to the first rib of the plurality of ribs and optionally of at least partially the plinth. Preferably, the assembly means are configured to carry out the assembly of the at least a second rib of the plurality of ribs and optionally of at least partially the plinth adjacent to the first rib of the plurality of ribs and optionally of at least partially the plinth in an essentially vertical direction. Optionally, the assembly means are configured to carry out the assembly of the at least a second rib of the plurality of ribs and optionally of at least partially the plinth adjacent to the first rib of the plurality of ribs and optionally of at least partially the plinth in an inclined direction with regard to the vertical direction.

The invention also relates to a method for manufacturing an adaptable precast foundation structure for a wind turbine carried out with the system above described, wherein the adaptable precast foundation structure comprises:
  a footing intended to rest on a ground;
  at least a plinth comprising a surface wherein a tower of the wind turbine is intended to be coupled;
  a transition structure comprising a plurality of ribs that extend radially outward from the surface or from a vertical projection of the surface wherein a tower of the wind turbine is intended to be coupled;
  and wherein the method comprises:
    a step of casting of at least a first rib of the transition structure further comprising a step of adjusting at least a representative dimension of the at least a first rib of the transition structure by means of the auxiliary formwork of the at least a first mould.

Preferably, the step of adjusting a representative dimension of the at least a first rib of the transition structure is a step of adjusting the length of the at least a first rib of the transition structure.

According to this and taking into account the ground or soil at each wind farm location wherein the precast foundation is going to be disposed, the method further comprises a step of selection of a precast foundation structure from a set of predetermined precast foundation structures, this step of selection being carried out prior to the step of adjusting a representative dimension of the at least a first rib of the transition structure. This makes possible that does not exist uncertainties in the design reliability and its structural behaviour.

Preferably, the step of casting of at least a first rib of the transition structure further comprises a step of casting at least partially the plinth.

Optionally, the method further comprises a step of pouring concrete into the first mould.

Preferably, the method further method comprises:
  a step of casting of at least a second rib of the transition structure further comprising a step of adjusting at least a representative dimension of the at least a second rib of the transition structure by means of the auxiliary formwork of the at least a second mould.

Preferably, the step of adjusting a representative dimension of the at least a second rib of the transition structure is a step of adjusting the length of the at least a second rib of the transition structure.

Preferably, in the step of adjusting the at least a representative dimension of the at least a first rib and in the step of adjusting the at least a representative dimension of the at least a second rib, the same representative dimension is adjusted for the at least a first rib and the at least a second rib, being preferably adjusted the same representative dimension to the same value for both the at least a first rib and the at least a second rib or being preferably adjusted the same representative dimension to a different value for the at least a first rib and the at least a second rib.

Preferably, the method for manufacturing an adaptable precast foundation structure for a wind turbine further comprises a step of transporting of the at least a first rib of the plurality of ribs of the transition structure from the first mould to the wind turbine location, preferably once the concrete of the at least a first rib is hardened and the at least a first rib has been demoulded from the first mould. Optionally, the step of transporting of the at least a first rib of the plurality of ribs is carried out transporting the at least a first rib in its final vertical orientation at the wind turbine location. Also optionally, the step of transporting of the at least a first rib of the plurality of ribs is carried out transporting the at least a first rib in an orientation being opposite to its final vertical orientation at the wind turbine location. This step of transporting optionally comprises transporting at least partially the plinth in case that the at least a first mould is also configured to cast at least partially the plinth.

Preferably, the method for manufacturing an adaptable precast foundation structure for a wind turbine further comprises a step of transporting of the at least a second rib of the plurality of ribs of the transition structure from the second mould to the wind turbine location, preferably once the concrete of the at least a second rib is hardened and the at least a second rib has been demoulded from the second mould. Optionally, the step of transporting of the at least a second rib of the plurality of ribs is carried out transporting the at least a second rib in its final vertical orientation at the wind turbine location. Also optionally, the step of transporting of the at least a second rib of the plurality of ribs is carried out transporting the at least a second rib in an orientation being opposite to its final vertical orientation at the wind turbine location. This step of transporting optionally comprises transporting at least partially the plinth in case that the at least a second mould is also configured to cast at least partially the plinth.

Optionally, the method further comprises a step of casting of the footing of the adaptable precast foundation structure.

Preferably, the step of casting of the footing of the adaptable precast foundation structure comprises a step of precasting of at least part of the footing of the adaptable precast foundation structure.

Also preferably, the step of casting of the footing of the adaptable precast foundation structure is a step of casting of the footing in-situ.

Also preferably, the step of casting of the footing is a step of casting the footing partially in the factory and partially in-situ. Preferably, the step of casting the footing comprises a step of casting a framework of the footing in the factory and a step of pouring concrete in-situ. The method further comprises a step of joining the at least a first rib of the plurality of ribs of the transition structure, and at least partially the framework of the footing, and/or a step of joining the at least a second rib of the plurality of ribs of the transition structure, and at least partially the framework of the footing. Once assembled, the spaces generated between the partial framework of the footing are completed with sectors of circular crown or triangular frameworks.

Optionally, the step of casting of at least a first rib of the transition structure further comprises a step of defining at least a channel in a lower surface of the at least a first rib of the plurality of ribs of the transition structure.

Optionally, the step of casting of at least a first rib of the transition structure further comprises a step of attaching first reinforcement elements to a free surface of the at least a first rib defined by the main formwork of the first mould, being an open formwork, preferably a step of attaching first reinforcement elements to a lower surface of the at least a first rib.

Optionally, the step of casting of at least a second rib of the transition structure further comprises a step of defining at least a channel in a lower surface of the at least a second rib of the plurality of ribs of the transition structure.

Optionally, the step of casting of at least a second rib of the transition structure further comprises a step of attaching reinforcement elements to a free surface of the at least a second rib defined by the main formwork of the second mould, being an open formwork, preferably a step of attaching first reinforcement elements to a lower surface of the at least a second rib.

Optionally, the method further comprises a step of assembling of at least the plurality of ribs of the transition structure, optionally by means of the plinth in case that the at least a first mould and/or the at least a second mould are/is also configured to cast at least partially the plinth.

Preferably, the step of assembling of at least the plurality of ribs of the transition structure is carried out assembling at least a second rib of the plurality of ribs adjacent to a first rib of the plurality of ribs. Optionally, the step of assembling of at least the plurality of ribs of the transition structure is carried out assembling at least a second rib of the plurality of ribs adjacent to the first rib of the plurality of ribs in an essentially vertical direction. Optionally, the step of assembling of at least the plurality of ribs of the transition structure is carried out assembling at least a second rib of the plurality of ribs adjacent to the first rib of the plurality of ribs in an inclined direction with regard to the vertical direction. In case that the at least a first mould and/or the at least a second mould are/is also configured to cast at least partially the plinth, the step of assembling is carried out assembling the at least partial plinth joined to the at least a second rib adjacent to the at least partial plinth joined to the at least a first rib.

Optionally, the step of assembling of at least the plurality of ribs of the transition structure further comprises assembling at least another first rib of the plurality of ribs adjacent to the second rib of the plurality of ribs, and so, alternately for the second and first ribs forming the transition structure until the transition structure is completed.

Optionally, the step of assembling of at least the plurality of ribs of the transition structure further comprises assembling at least another second rib of the plurality of ribs adjacent to the first rib of the plurality of ribs or to another first rib of the plurality the ribs after all the first ribs of the plurality of ribs have been assembled, and so, for all the second ribs forming the transition structure until the transition structure is completed.

For any of the above explained steps of assembling, when the at least a first mould and/or the at least a second mould are/is also configured to cast at least partially the plinth, the step of assembling is carried out assembling the at least partial plinth joined to the at least a second rib adjacent to the at least partial plinth joined to the at least a first rib.

For any of the above explained steps of assembling, when the step of casting of the footing of the adaptable precast foundation structure is a step of casting of the footing in-situ, during the step of assembling, the first reinforcement elements of the ribs, weaves together with the framework of the footing, comprising preferably the first reinforcement elements an opened lower end.

For any of the above explained steps of assembling, when the step of casting of the footing of the adaptable precast foundation structure is a step of casting the footing partially in the factory and partially in-situ, during the step of joining the ribs of the transition structure, and at least partially the framework of the footing, the first reinforcement elements of the ribs, weaves together with the partial framework of the footing, comprising preferably the first reinforcement elements a closed or looped lower end. Optionally, the method further comprises a step of post-tensioning the adaptable precast foundation structure after the step of assembling of at least the plurality of ribs of the transition structure by means of the plinth.

Preferably, the step of post-tensioning the adaptable precast foundation structure is carried out in a circumferential direction of the plinth and/or in a radial direction of at least one of the plurality of ribs of the transition structure.

The invention also relates to a system for manufacturing a precast foundation structure for a wind turbine, according to claims 1 to 9, here included by reference, to a method for manufacturing a precast foundation structure for a wind turbine according to claims 10 to 13, here included by reference and to a precast foundation structure for a wind turbine according to claims 14 to 18, here included by reference.

Optionally, each inclined surface of the sectors of the plinth is perpendicular to a radial plane containing the vertical axis, being the same or different radial planes for each inclined surface in each sector or for different sectors of the plinth. The same applies mutatis mutandis for the inclined surfaces of the moulds of the system.

The at least one first inclined wall of the first sector of the plinth inclined, in use, with regard to the vertical axis of the tower, and the at least one first inclined wall of the second sector of the plinth inclined, in use, with regard to the vertical axis of the tower, casted by the corresponding moulds, as defined in claim 1, allow that during assembly, all parts of the sealing means contact at the same time and that the sealing means are not dragged.

Preferably, the inclined walls form an angle between 10° and 30°, more preferably 20°, with the vertical, to avoid dragging the sealing means during assembly. The assembly can be carried out in an essentially vertical direction as claimed in claim 11, in an essentially horizontal direction as claimed in claim 12, or even in a combination of a vertical and horizontal direction, thus facilitating the assembly depending on the available assembly means, the space for carrying out the assembly and the kind of foundation to be manufactured.

PREFERRED EMBODIMENT OF THE INVENTION

A preferred embodiment of the invention relates to a system for manufacturing an adaptable precast foundation structure for a wind turbine, wherein the adaptable precast foundation structure comprises:

a footing (1) intended to rest on a ground (2);
at least a plinth (3) comprising a surface (5) wherein a tower of the wind turbine is intended to be coupled;
a transition structure comprising a plurality of ribs (4) that extend radially outward from the surface (5) or from a vertical projection of the surface (5) wherein a tower of the wind turbine is intended to be coupled;
and wherein the system comprises:
at least a first mould (100) configured to cast at least a first rib (4') of the transition structure, wherein the first mould (100) comprises a main formwork (101) and an auxiliary formwork (102), and wherein the auxiliary formwork (102) is configured to adjust at least a representative dimension (D) of the at least a first rib (4') of the transition structure, wherein the representative dimension (D) of the at least a first rib (4') of the transition structure is preferably the length of the at least a first rib (4') of the transition structure.

The plurality of ribs (4) of the transition structure may comprise a single rib design (with a single mould) or comprise at least two different designs, which when placed adjacent to each other are complementary, as explained hereunder.

The system further comprises at least a second mould (100') configured to cast at least a second rib (4") of the transition structure, wherein the second mould (100') comprises a main formwork (101') and an auxiliary formwork (102'), and wherein the auxiliary formwork (102') is configured to adjust at least a representative dimension (D') of the at least a second rib (4") of the transition structure, wherein the representative dimension (D') of the at least a second rib (4") of the transition structure is preferably the length of the at least a second rib (4") of the transition structure.

Preferably, the representative dimension (D, D') of the at least a first rib (4') and of the at least a second rib (4") is the same. However, it can be different. For instance, in case of having at least a first rib (4') and at least a second rib (4'), it is possible to adjust the at least a representative dimension (D) of the at least a first rib (4') in a dependent or independent manner of adjusting the at least a representative dimension (D') of the at least a second rib (4") depending of the type of soil and the necessary size of each rib of the transition structure.

The system further comprises concreting means configured to pour concrete into the first mould (100) and/or the second mould (100').

The auxiliary formwork (102, 102') comprises a plate that is displaceable along the representative dimension (D, D') of the rib (4', 4") before the concreting means pours concrete into the first mould (100) or the second mould (100').

Figure 1:
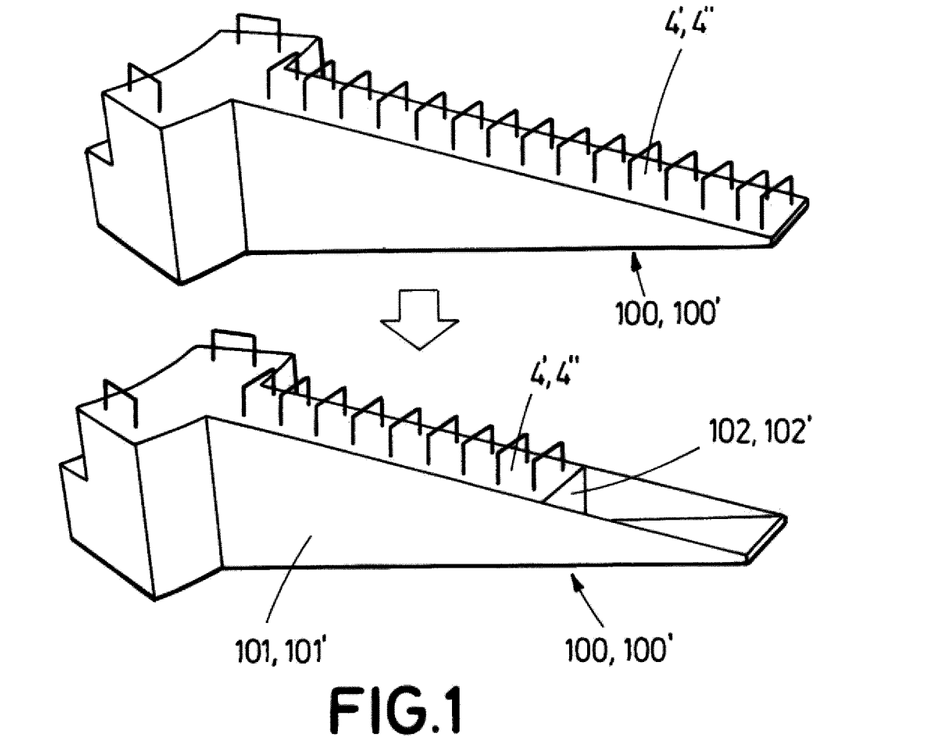
FIG. 1 shows a perspective view of the first mould of the system for manufacturing an adaptable precast foundation structure for a wind turbine of the present invention according to a first preferred embodiment.

The at least a first mould (100) and the at least a second mould (100') are also configured to cast at least partially the plinth (3) as shown in FIG. 1, wherein a tower, either directly or by means of an intermediate element, is intended to be coupled. In this way, each one of the plurality of ribs (4) comprises a first end (11) adjacent to the plinth (3), a second end (12) opposite to the first end (11) and a central beam (13) disposed between the first end (11) and the second end (12). The precast plinth (3) comprises several sectors depending on the size of the foundation. In case of having at least a first rib (4') and at least a second rib (4"), the several sectors (3', 3") are at least a first sector (3') and at least a second sector (3"), wherein a first sector (3') is adjacent to the at least a first rib (4') both being casted as a single body in the at least a first mould (100) and wherein a second sector (3") is adjacent to the at least a second rib (4") both being casted as a single body in the at least a second mould (100'). In another embodiment, the first ends (11) of the ribs (4) may be attached to a ring shape plinth (not shown).

Figure 5A:
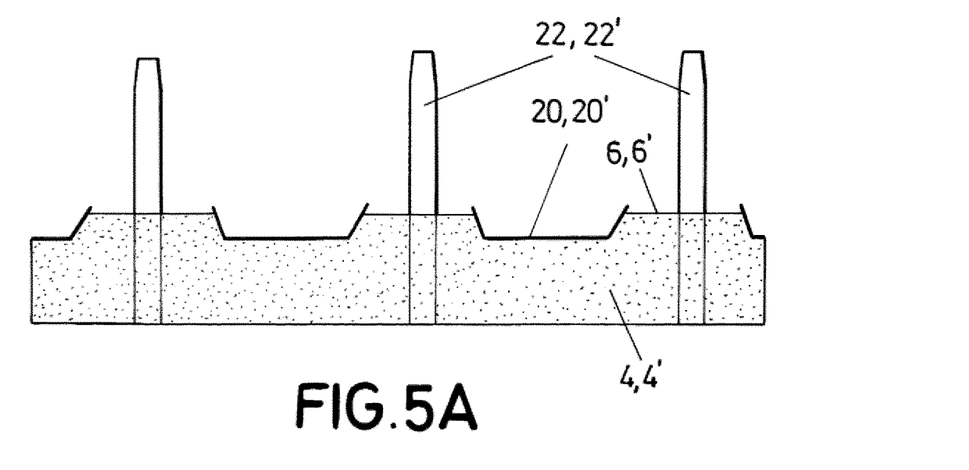
FIGS. 5A to 5C show a partial section view of the adjustable precast foundation structure, wherein the reinforcement elements and the template of the main formwork of the at least a first mould or the at least a second mould of the system of the present invention are disposed, a perspective view of the template and one of the reinforcements of the first reinforcements, and a bottom view of a first rib or a second rib of the transition structure, respectively.
Figure 5B:
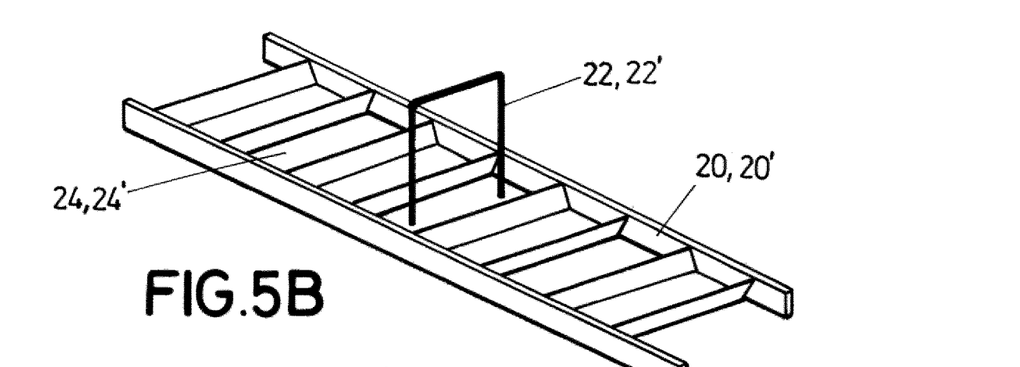
Figure 5C:
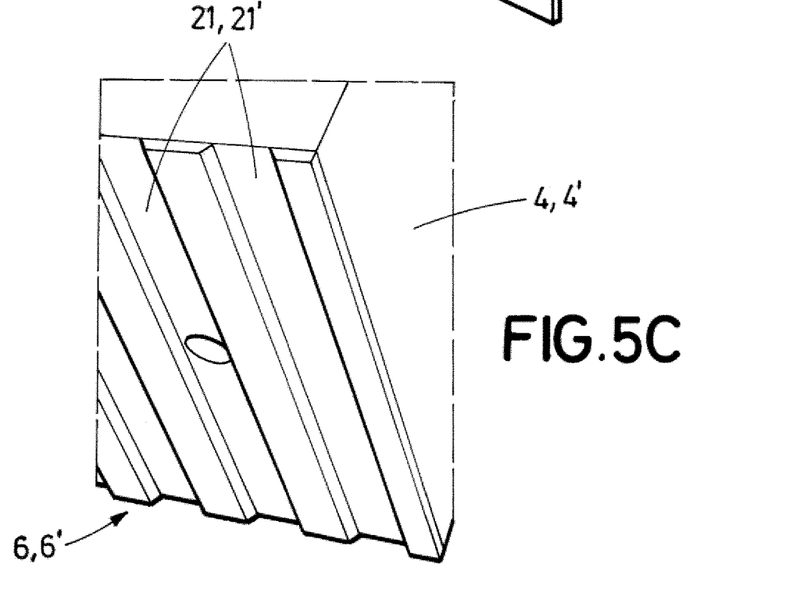
Figures 6A, 6B:
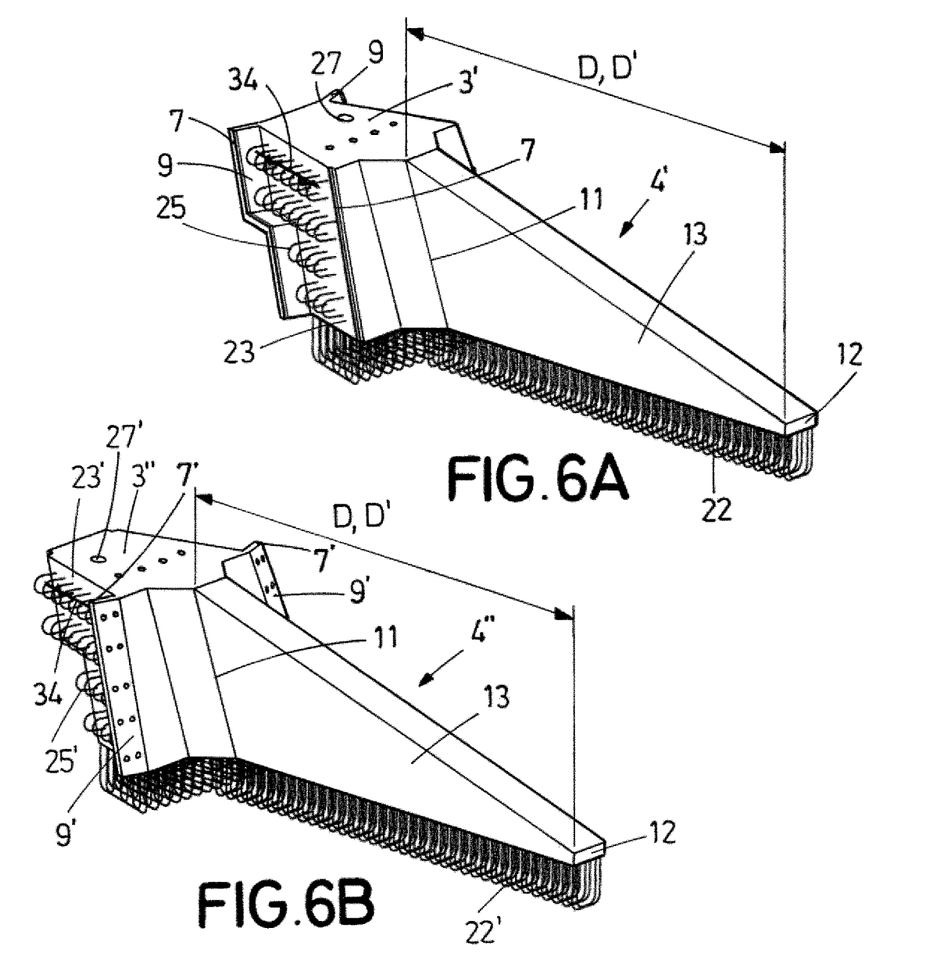
FIGS. 6A and 6B show a first rib and a second rib respectively and at least partially the plinth, the first rib and the second rib being adjacent ribs of the transition structure.
Figure 6C:
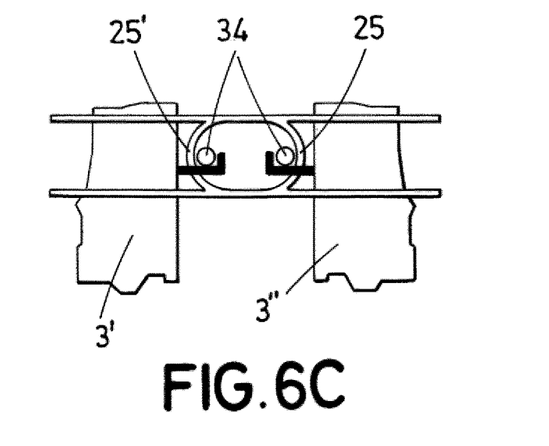
FIG. 6C shows additional transversal bars disposed running through the second reinforcement elements, thus configuring a passive framework.
Figure 6D:
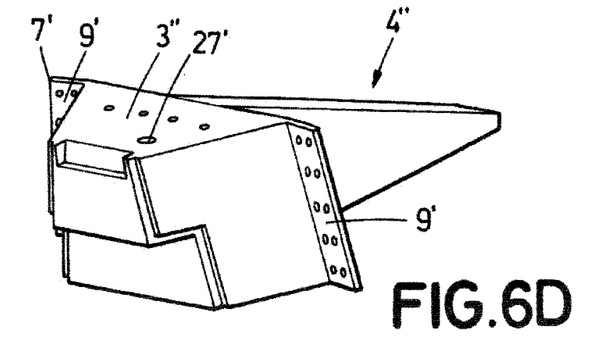
FIGS. 6D and 6E show a first rib and a second rib respectively and at least partially the plinth, the first rib and the second rib being adjacent ribs of the transition structure, according to another embodiment different to that shown in FIGS. 6A and 6B.
Figure 6E:
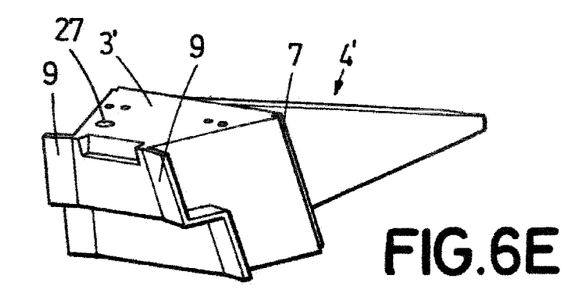

Preferably, the main formwork (101, 101') of the first mould (100) and/or of the second mould (100') further comprises a template (20, 20') configured to define at least a channel (21, 21') in a lower surface (6, 6') of at least a first rib (4') and/or of at least a second rib (4") of the plurality of ribs (4) of the transition structure, the template (20, 20') comprising windows (24, 24') in such a way that the main formwork (101, 101') of the first mould (100) and/or of the second mould (100') is an open formwork, wherein the windows (24, 24') define at least one free surface wherein first reinforcement elements (22, 22') are intended to be attached. The first reinforcement elements (22, 22') are disposed on the lower surface (6, 6') of the at least a first rib (4') and/or of the at least a second rib (4") once the at least a first rib (4') and/or the at least a second rib (4") are/is turned over before the assembly.

Figure 8A:
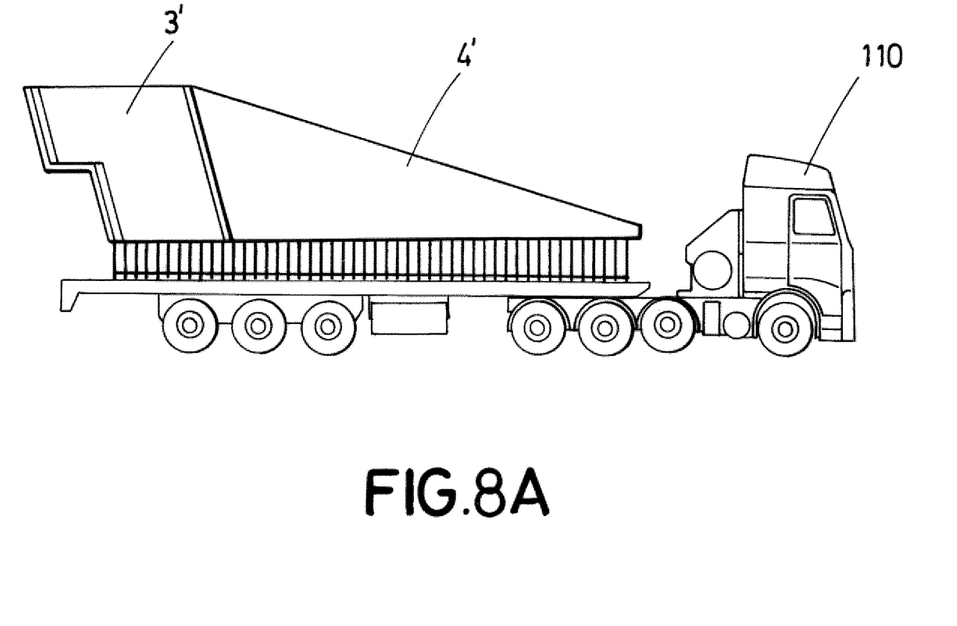
FIGS. 8A and 8B show different embodiments of the step of transporting of the at least a first rib or the at least a second rib and at least partially the plinth of the method of the present invention.
Figure 8B:
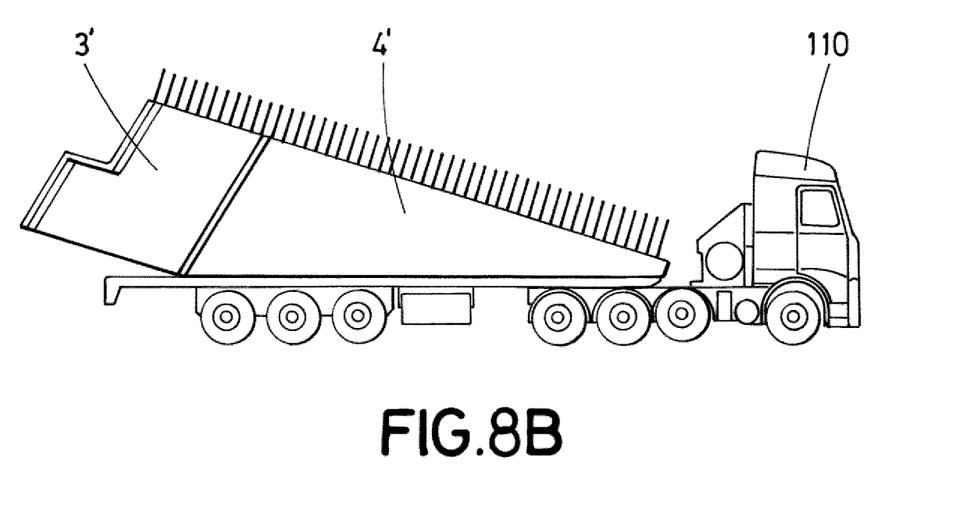
Figure 9A:
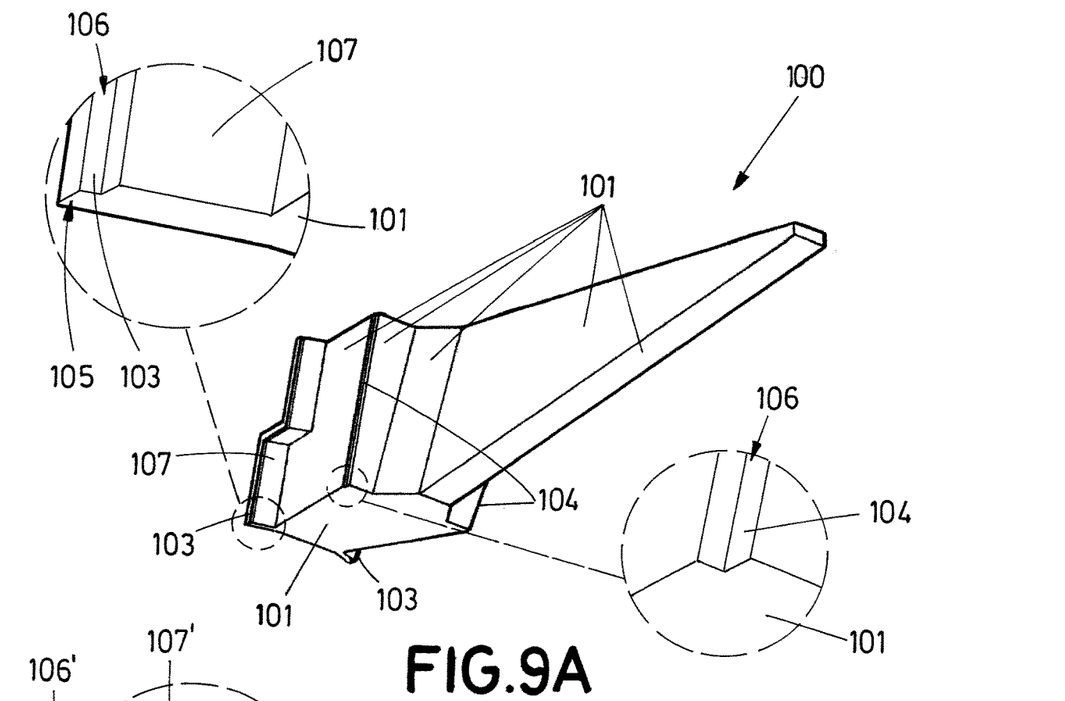
FIGS. 9A and 9B show a perspective view of the first mould and the second mould of the system for manufacturing a precast foundation structure for a wind turbine of the present invention according to the embodiment of claims 1 to 9.
Figure 9B:
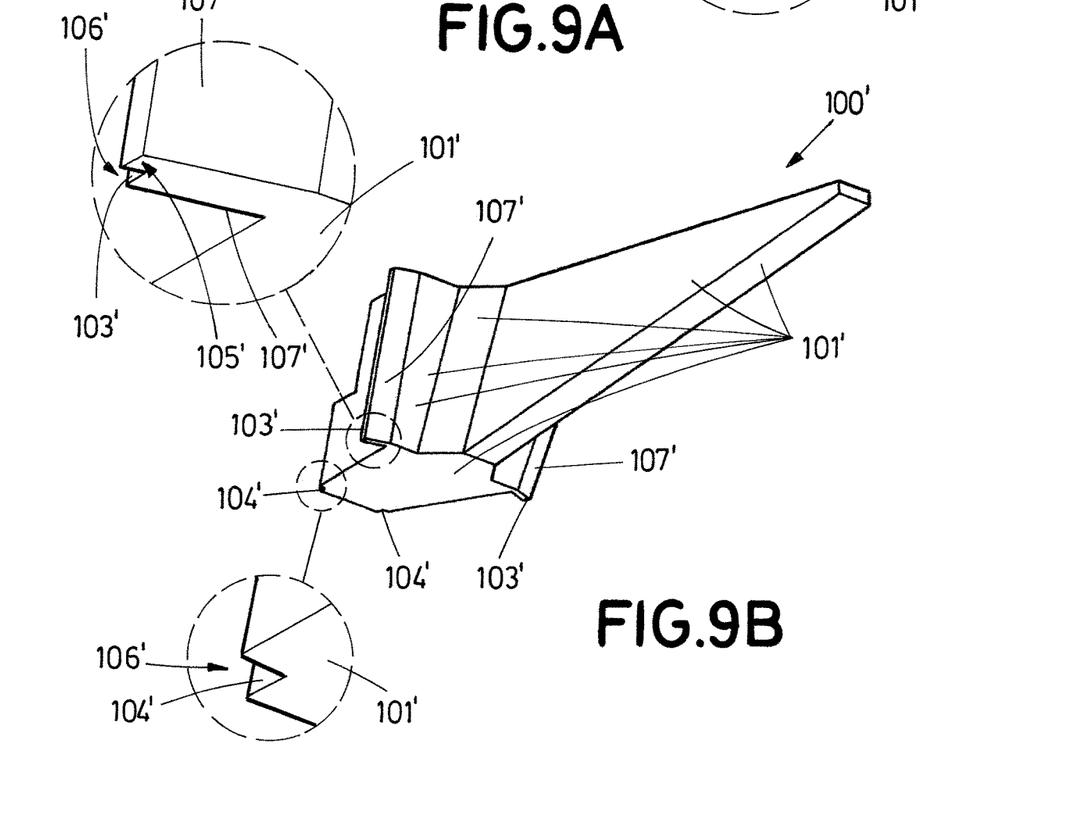

The system for manufacturing an adaptable precast foundation structure for a wind turbine further comprises transportation means (110) configured to transport at least a first rib (4') of the plurality of ribs of the transition structure and/or a first sector (3') of the plinth (3) from the first mould (100) to the wind turbine location (120). As can be seen from FIGS. 8A and 8B, the transportation of the at least a first rib (4') of the plurality of ribs and/or the first sector (3') of the plinth (3) may be carried out transporting the at least a first rib (4') and a sector (3') of the plinth (3) in its final vertical orientation at the wind turbine location (FIG. 8A) or in an orientation being opposite to its final vertical orientation at the wind turbine location (FIG. 8B).

The transportation means (110) are also configured to transport at least a second rib (4") of the plurality of ribs of the transition structure and a second sector (3") of the plinth (3) from the second mould (100') to the wind turbine location (120) in the same manner as explained above for the at least a first rib (4') and the first sector (3') of the plinth (3).

Figure 3A:
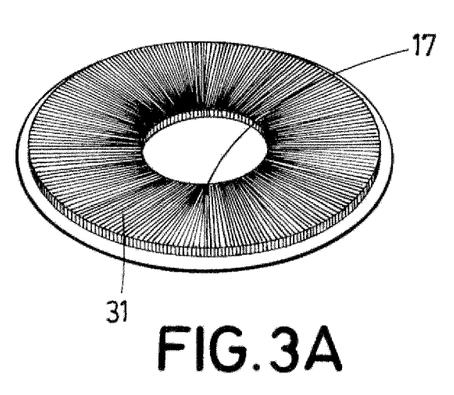
FIGS. 3A to 3F show several steps of the method for manufacturing an adaptable precast foundation structure for a wind turbine of the present invention, according to a first embodiment.
Figure 3B:
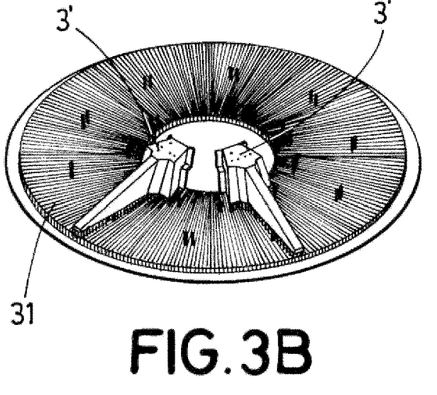
Figure 3E:
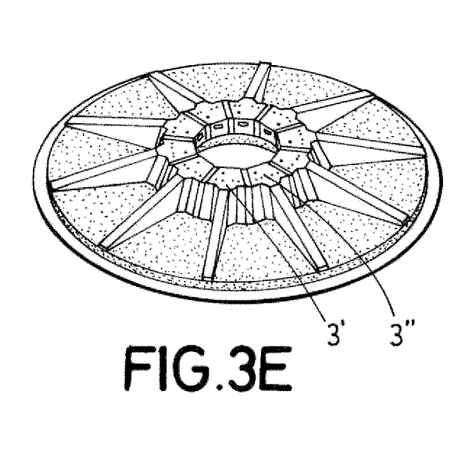
Figure 3F:
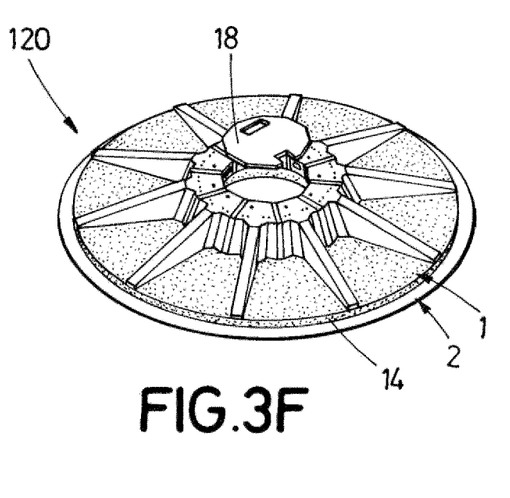
Figure 4A:
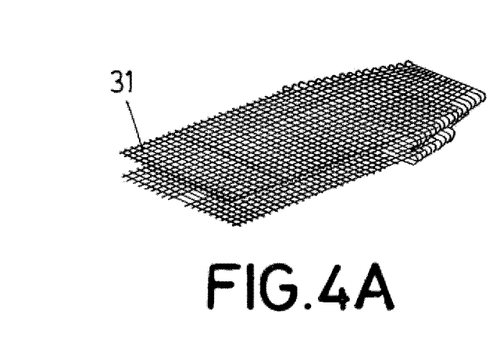
FIGS. 4A to 4G show several steps of the method for manufacturing an adaptable precast foundation structure for a wind turbine of the present invention, according to a second embodiment.
Figure 4B:
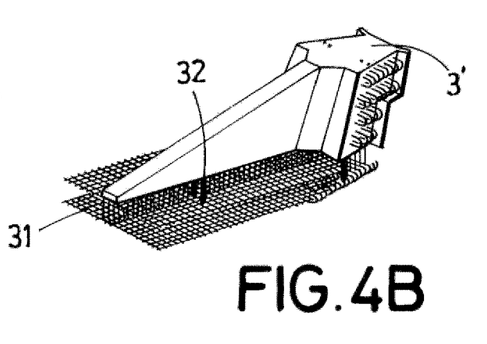
Figure 4C:
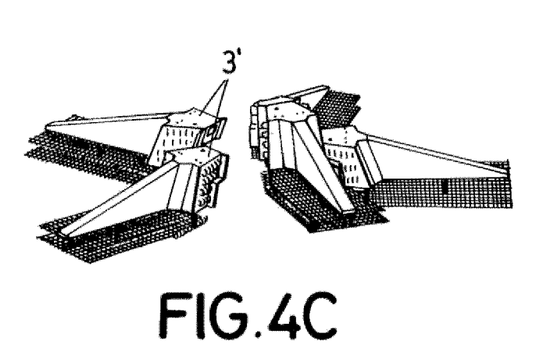
Figure 4D:
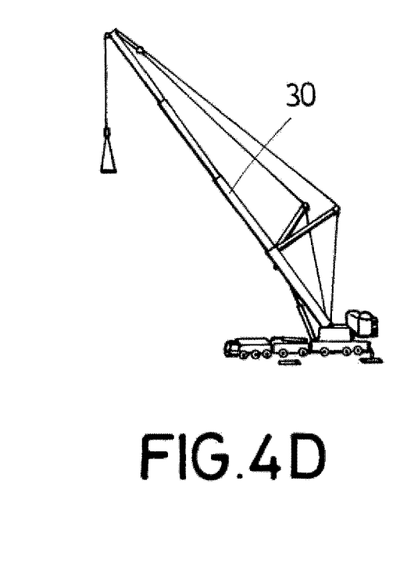
Figure 4E:
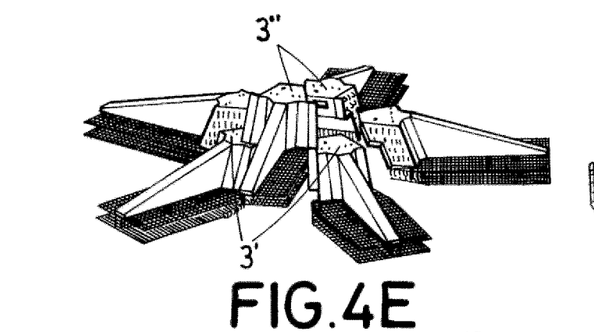
Figure 4F:
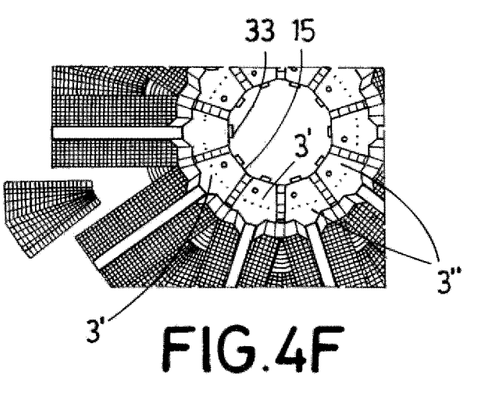
Figure 4G:
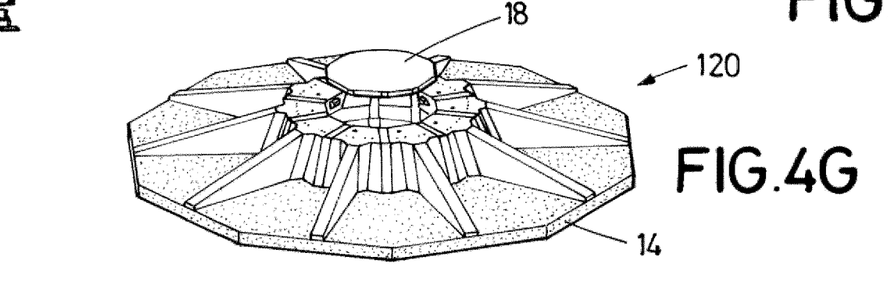

The system further comprises means for casting the footing (1). In a first preferred embodiment, the means for casting the footing (1) comprises an additional mould (not shown) configured to precast at least partially the footing (1) of the adaptable precast foundation structure. In this way, the footing (1) is a precast concrete footing, preferably a slab. In a second preferred embodiment, the means for casting the footing (1) are means for casting the footing in-situ. In this way, the footing is a cast-in-situ concrete footing, preferably a slab comprising a framework (31) as shown in FIGS. 3A and 3E. Also preferably, the means for casting the footing (1) are means for casting the footing partially in the factory and partially in-situ. Preferably, the footing comprises a framework (31) and concrete, wherein the framework is casted in the factory and the concrete is poured in-situ on the framework (31) of the footing (1), as shown in FIGS. 4A and 4G respectively, thus configuring a slab.

The system further comprises assembly means (30), preferably a crane, configured to carry out the assembly of at least the plurality of ribs (4) of the transition structure and the sectors of the plinth (3).

Figure 3C:
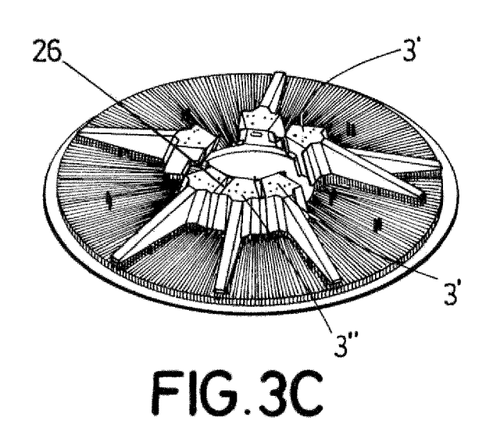
Figure 3D:
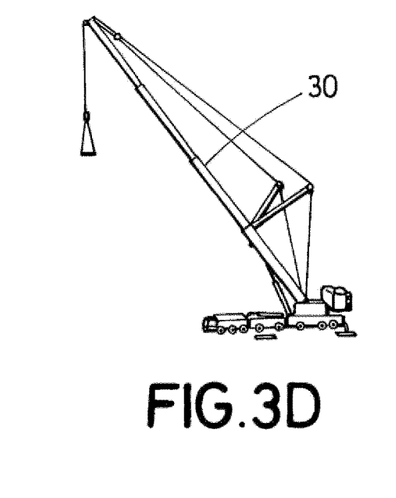

Preferably, the assembly means (30) are configured to carry out the assembly of the plurality of ribs (4) and/or their corresponding sectors of the plinth (3) adjacent one to each other, in an essentially vertical direction as can be seen in FIG. 3C.

In case of having first ribs (4') and second ribs (4"), the assembly means (30) are configured to carry out the assembly of at least the plurality of ribs of the transition structure and the sectors (3', 3") of the plinth (3) assembling at least a first rib (4') of the plurality of ribs and its corresponding first sector (3') of the plinth (3) adjacent to a second rib (4") of the plurality of ribs and its corresponding second sector (3") of the plinth (3), and so, alternately until the transition structure and the plinth (3) are completed.

The adaptable precast foundation further comprises joining means (32) configured to join the at least a first rib (4') of the plurality of ribs of the transition structure and at least partially the framework (31) of the footing (1) and/or the at least a second rib (4") of the plurality of ribs of the transition structure and at least partially the framework (31) of the footing. In this way, it is not necessary to carry out the positioning of the framework (31) of the footing (1) in situ, thus avoiding additional steps in the assembly procedure.

Each sector (3', 3") of the precast plinth (3) comprises two lateral surfaces (23, 23') wherein second reinforcement elements (25, 25'), being lateral reinforcement elements, are intended to be attached.

Optionally, the adaptable precast foundation further comprises radial post-tensioning elements (not shown) that run from each sector (3', 3") of the plinth (3) running through the ribs (4', 4") (first end (11), central beam (13) and second end (12)) until reach the second end (12) of the ribs (4', 4"), connecting in this way the transition structure to the plinth (3).

Figure 2A:
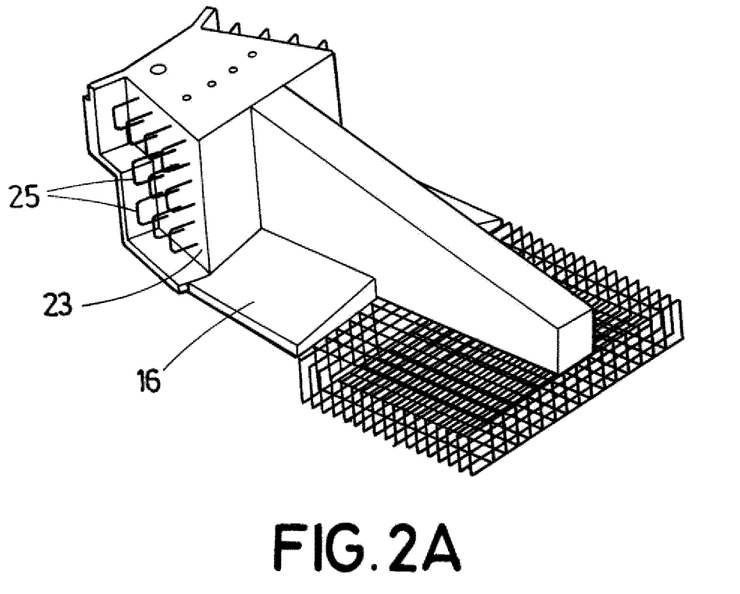
FIGS. 2A and 2B show several embodiments of at least one rib together with a part of the plinth manufactured with the system of the present invention.
Figure 2B:
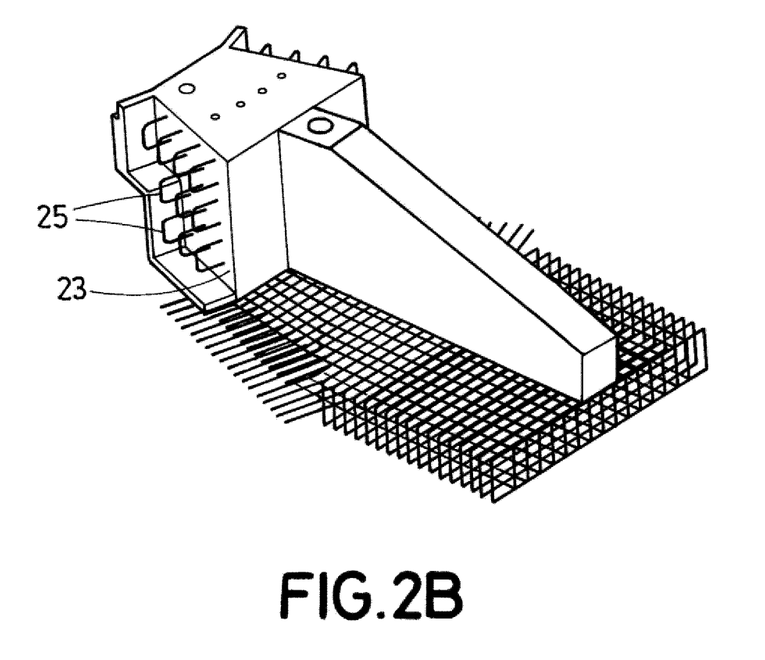

Optionally, the adaptable precast foundation further comprises post-tensioning circumferential elements (not shown) that run through each sector (3', 3") of the plinth (3) in a circumferential direction for connecting all the sectors (3', 3") of the plinth (3), being preferably compression post-tensioning elements. In another embodiment, the plurality of ribs (4) comprises fins (16) disposed on both sides of the central beam (13) as can be seen in FIG. 2A.

The fins (16) transfer the weight of a filler soil located on the fins (16) to the adaptable precast foundation, making it more stable.

The footing (1) comprises a slab which in turn comprises an inner diameter (17) and an outer diameter (14). The dimensions of the inner diameter (17) and the outer diameter (14) depend on the wind turbine loads and also on the strength and the elastic properties of the ground (2). In a first preferred embodiment, the inner diameter (17) of the footing (1) is the same that an inner diameter (15) of the plinth (3) and the outer diameter (14) of the footing (1) reaches the second end (12) of the ribs (1) once assembled the adaptable precast foundation structure. In a second preferred embodiment, the inner diameter (17) of the footing (1) is larger than the inner diameter (15) of the plinth (3) and the outer diameter (14) of the footing (1) reaches the second end (12) of the ribs (1). In a third preferred embodiment, the inner diameter (17) of the footing (1) is larger than the inner diameter (15) of the plinth (3) and the outer diameter (14) of the footing (1) does not reach the second end (12) of the ribs (1).

Additionally, depending on the features of the ground (2), the adaptable precast foundation could be combined with rock anchors, a pile cap of micropiles, or an alluvial-anker, but the adaptable precast foundation would not be modified.

Figures 10A, 10B:
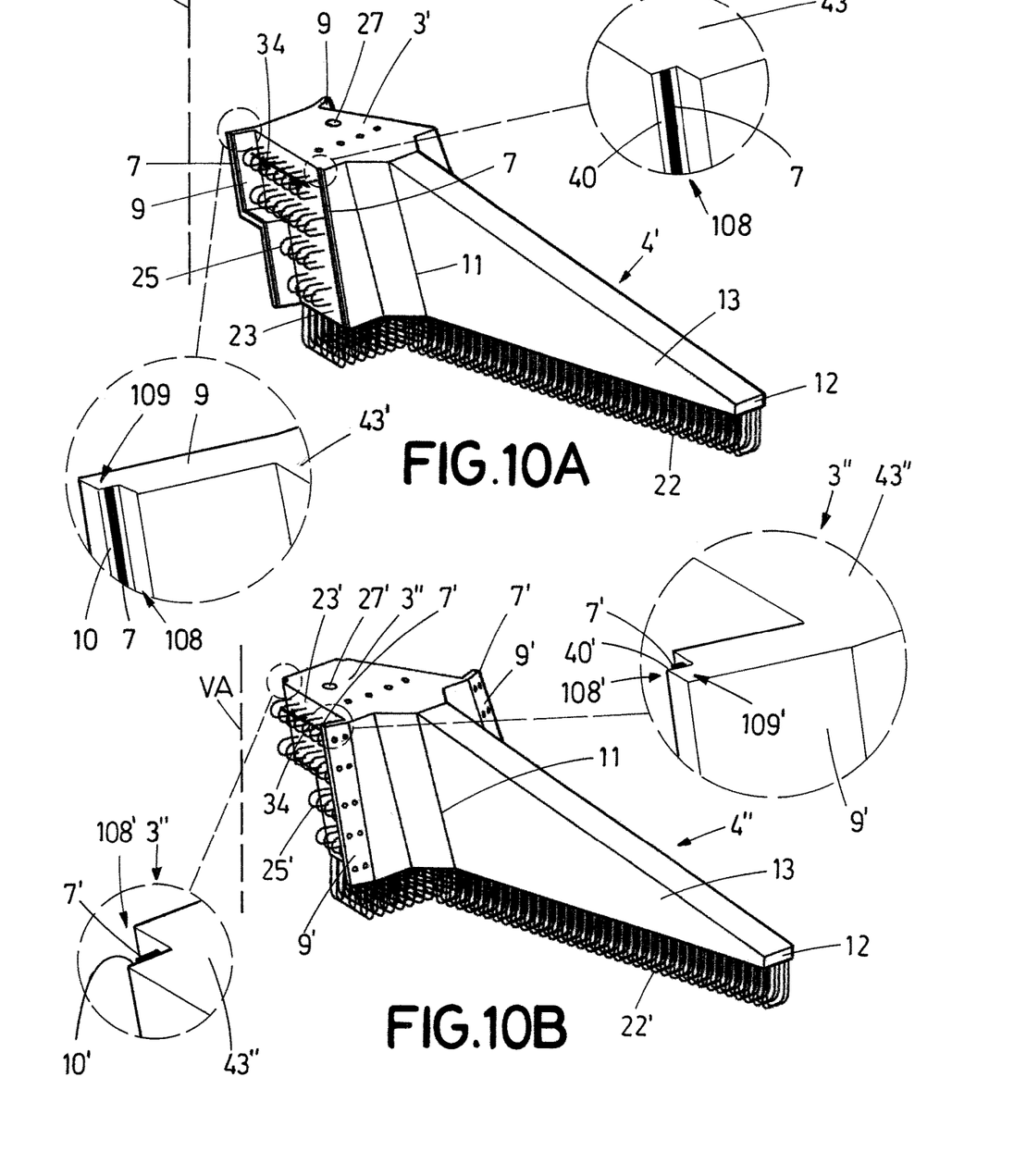
FIGS. 10A and 10B show a first sector and a second sector of the plinth respectively of the precast foundation structure for a wind turbine according to claims 14 to 18.

The first sectors (3') of the plinth (3) comprise first wings (9), preferably disposed at the inner diameter (15) of the plinth (3), and the second sectors (3") of the plinth (3) comprise second wings (9'), preferably disposed at an outer diameter (19) of the plinth, wherein the first wings (9) are adjacent in a circumferential direction to the second sectors (3") of the plinth (3) and the second wings (9') are adjacent in a circumferential direction to the first sectors (3') of the plinth (3), thus generating a gap (26) between adjacent sectors (3', 3") of the plinth (3) wherein the second reinforcement elements (25, 25') of each one of the sectors (3', 3") intersect once assembled adjacent sectors (3', 3") of the plinth (3). Additional transversal bars (34) run through said intersection of the second reinforcement elements (25, 25'), reinforcing the union between adjacent sectors (3', 3") of the plinth (3) and therefore indirectly reinforcing the union between adjacent ribs (4, 4") configuring a passive framework, nor being post-tensioned. These transversal (34) bars are entered through holes disposed in the second wings (9') of the second sectors (3") of the plinth (3).

The first wings (9) and/or the second wings (9') comprise/s sealing means (7, 7'), preferably rubber sealing strips, configured to seal the assembly between adjacent sectors (3', 3") of the plinth (3) and to retain the concrete.

Figure 7:
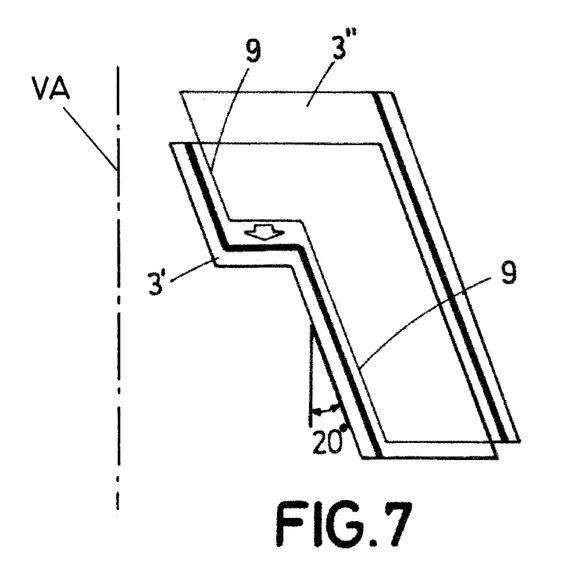
FIG. 7 shows the step of assembling the second rib of FIG. 6B adjacent to the first rib of FIG. 6A.

Optionally, the first wings (9) and the second wings (9') are disposed inclined with respect to the vertical. Preferably, the inclined wings form 20° with the vertical (see FIG. 7), to avoid dragging the sealing means (7, 7') during vertical assembly. The gaps (26) generated between adjacent sectors (3', 3") of the plinth (3) can be filled with concrete or grouting once the additional transversal bars (34) are placed.

After this, the plinth (3) can be post-tensioned, by means of circumferential post-tensioning elements.

Additionally, each sector (3', 3") of the plinth (3) comprises a corbel (8) that in turn comprises at least a hole (27, 27') wherein tensioning cables of the tower are anchored.

The adaptable precast foundation structure may comprise an upper slab (18), optionally comprising two semi slabs supported on a socket (33) disposed on the corbel (8) of the plinth (3), the upper slab (18) being at the same level than the surface (5) of the plinth (3) wherein a tower of the wind turbine is intended to be coupled.

Example

Next table shows different values of the total diameter of the foundation depending on the type of soil which serves as a basis for carrying out the step of selection of a precast foundation structure of the method for manufacturing an adaptable precast foundation structure for a wind turbine of the present invention.

| Diameter of the foundation (m) | Soil type | SBC (kPa) | Concrete ($m^3$) | Steel (tn) | Kr (GN · m/rad) |
|---|---|---|---|---|---|
| 17-22 | Rocky - Hard | 500-250 | 300-470 | 45-60 | 450-360 |
| 22-24 | Medium-Soft | 250-150 | 470-520 | 55-70 | 370-320 |
| 24-27 | Soft-Very soft | 170-130 | 530-650 | 65-80 | 330-280 |

In this case the table would be valid for a N155 4.8MW wind turbine with a TC120N tower (concrete tower with hub at a height of 120 m).

So, the at least a representative dimension (D, D') of the at least a first rib and/or of the at least a second rib, depends on a total diameter of the foundation, which in turn depends on the type of soil. In this case, the at least a representative dimension (D, D') of the at least a first rib and/or of the at least a second rib is the length of the at least a first rib and/or the length of the at least a second rib respectively, being this length half of the difference of the total diameter of the foundation minus an outer diameter of the plinth (3).

In this case, the design has been conceived so that the diameter of the plinth (3) is always the same, regardless of the type of tower and machine, being the outer diameter of the plinth (3) in an interval of 9-13 m.

The invention claimed is:

1. A system for manufacturing a precast foundation structure for a wind turbine, wherein the precast foundation structure comprises:
at least a plinth comprising:
a surface wherein a tower of the wind turbine is intended to be coupled, the tower defining a vertical axis when the tower is coupled on the surface; and
several adjacent sectors, wherein the several adjacent sectors are at least a first sector and at least a second sector;
a seal, configured to seal an assembly between the adjacent sectors of the plinth;
and wherein the system comprises:
a first mould comprising a main formwork and a secondary formwork, wherein the first mould is configured to cast at least the first sector of the plinth;
a second mould comprising a main formwork and a secondary formwork, wherein the second mould is configured to cast at least the second sector of the plinth;
fastening means configured to attach the seal to the sectors of the plinth;
assembly means configured to carry out the assembly of the sectors of the plinth; wherein the secondary formwork of the first mould comprises:
at least one first inclined surface configured to cast at least one first inclined wall of the first sector of the plinth inclined, in use, with regard to the vertical axis of the tower;
and in that the secondary formwork of the second mould comprises:
at least one first inclined surface configured to cast at least one first inclined wall of the second sector of the plinth inclined, in use, with regard to the vertical axis of the tower;
wherein, in use, the fastening means is configured to attach the seal to the first inclined walls of the sectors of the plinth.

2. The system of claim 1 wherein the secondary formwork of the first mould and the secondary formwork of the second mould comprise protrusions which in turn comprise recesses wherein the at least one first inclined surface of the secondary formwork of the first mould and the at least one first inclined surface of the secondary formwork of the second mould are disposed, respectively.

3. The system of claim 2 wherein the secondary formwork of the first mould and the secondary formwork of the second mould comprise at least one inclined plate that joins the protrusions which in turn comprise recesses with the main formwork, wherein the at least one inclined plate together with the protrusions of the secondary formwork of the first mould and the secondary formwork of the second mould are configured to cast first wings of the first sector of the plinth and second wings of the second sector of the plinth, respectively.

4. The system of claim 1 wherein the secondary formwork of the first mould and the secondary formwork of the second mould comprise recesses wherein the at least one first inclined surface of the secondary formwork of the first mould and the at least one first inclined surface of the secondary formwork of the second mould are disposed, respectively.

5. The system of claim 1, wherein:
the secondary formwork of the first mould comprises:
two first inclined surfaces configured to cast two first inclined walls of the first sector of the plinth inclined, in use, with regard to the vertical axis of the tower; and
two second inclined surfaces configured to cast two second inclined walls of the first sector of the plinth inclined, in use, with regard to the vertical axis of the tower; and
the secondary formwork of the second mould comprises:

two first inclined surfaces configured to cast two first inclined walls of the second sector of the plinth inclined, in use, with regard to the vertical axis of the tower; and two second inclined surfaces configured to cast two second inclined walls of the second sector of the plinth inclined, in use, with regard to the vertical axis of the tower.

6. The system of claim 5, wherein each one of the secondary formwork of the first mould and the secondary formwork of the second mould comprises two protrusions which in turn comprise recesses wherein the two first inclined surfaces of the secondary formwork of the first mould and the secondary formwork of the second mould are disposed, respectively.

7. The system of claim 6 wherein each one of the secondary formwork of the first mould and the secondary formwork of the second mould comprises recesses wherein the two second inclined surfaces of the secondary formwork of the first mould and the secondary formwork of the second mould are disposed, respectively; and wherein the protrusions which in turn comprise recesses of the secondary formwork of the first mould and the secondary formwork of the second mould are antagonist to the recesses of the secondary formwork of the second mould and the secondary formwork of the first mould, respectively.

8. The system of claim 5 wherein each one of the secondary formwork of the first mould and the secondary formwork of the second mould comprises recesses wherein the two second inclined surfaces of the secondary formwork of the first mould and the secondary formwork of the second mould are disposed, respectively.

9. The system of claim 1 wherein the main formwork of the first mould and the main formwork of the second mould are the same.

10. A method for manufacturing a precast foundation structure for a wind turbine carried out with the system of claim 1, wherein the precast foundation structure comprises:
at least a plinth comprising:
a surface wherein a tower of the wind turbine is intended to be coupled, the tower defining a vertical axis when the tower is coupled on the surface; and
several adjacent sectors, wherein the several adjacent sectors are at least a first sector and at least a second sector;
a seal, configured to seal the assembly between the adjacent the sectors of the plinth;
and wherein the method comprises at least:
a step of casting at least the first sector of the plinth;
a step of casting at least the second sector of the plinth;
a step of attaching the seal to the sectors of the plinth;
a step of assembling the sectors of the plinth;
wherein in the step of casting at least the first sector of the plinth is casted at least one first inclined wall of the first sector of the plinth inclined, in use, with regard to the vertical axis of the tower, in that in the step of casting at least the second sector of the plinth is casted at least one first inclined wall of the second sector of the plinth inclined, in use, with regard to the vertical axis of the tower and in that in the step of attaching the seal to the sectors of the plinth, the seal is attached to the first inclined walls of the sectors of the plinth.

11. The method of claim 10, wherein the step of assembling the sectors of the plinth is carried out in an essentially vertical direction.

12. The method of claim 10, wherein the step of assembling the sectors of the plinth is carried out in an essentially horizontal direction.

13. The method of claim 10, wherein the step of casting at least the first sector of the plinth and the step of casting at least the second sector of the plinth is carried out with the main formwork of the first mould and with the main formwork of the second mould being the same.

14. A precast foundation structure for a wind turbine, manufactured with the method of claim 10 wherein the precast foundation comprises:
at least a plinth comprising:
a surface wherein a tower of the wind turbine is intended to be coupled, the tower defining a vertical axis when the tower is coupled on the surface; and
several adjacent sectors, wherein the several adjacent sectors are at least a first sector and at least a second sector;
a seal, configured to seal the assembly between the adjacent the sectors of the plinth;
wherein the first sector of the plinth comprises at least one first inclined wall inclined, in use, with regard to the vertical axis of the tower, in that the second sector of the plinth comprises at least one first inclined wall inclined, in use, with regard to the vertical axis of the tower, wherein the seal is attached to the first inclined walls of the sectors of the plinth.

15. The precast foundation structure of claim 14 wherein the first inclined walls are disposed in a cavity which in turn is disposed in a projection of the first sector or the second sector of the plinth, or in a cavity of the first sector or the second sector of the plinth.

16. The precast foundation structure of claim 15 wherein the first sector of the plinth comprises first wings extending from a central body of the first sector till the projection and the second sector of the plinth comprises second wings extending from a central body of the second sector till the projection.

17. The precast foundation structure of claim 14 wherein the first sector of the plinth comprises two first inclined walls and two second inclined walls inclined, in use, with regard to the vertical axis of the tower, in that the second sector of the plinth comprises two first inclined walls and two second inclined walls inclined, in use, with regard to the vertical axis of the tower, wherein the seal are attached to the first inclined walls and to the second inclined walls of the sectors of the plinth.

18. The precast foundation structure of claim 17 wherein the first inclined walls of the first sector of the plinth are antagonist to the second inclined walls of the second sector of the plinth and the first inclined walls of the second sector of the plinth are antagonist to the second inclined walls of the first sector of the plinth.

\* \* \* \* \*